United States Patent
Cheong et al.

(10) Patent No.: US 11,943,079 B2
(45) Date of Patent: Mar. 26, 2024

(54) METHOD FOR SHARING CHANNEL INFORMATION IN BLUETOOTH NETWORK, AND ELECTRONIC DEVICE THEREFOR

(71) Applicant: Samsung Electronics Co., Ltd., Gyeonggi-do (KR)

(72) Inventors: Gupil Cheong, Gyeonggi-do (KR); Doosu Na, Gyeonggi-do (KR); Chunho Park, Gyeonggi-do (KR); Heejae Yoon, Gyeonggi-do (KR); Wonkyoung Jang, Gyeonggi-do (KR); Sungjun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 17/434,041

(22) PCT Filed: Mar. 4, 2020

(86) PCT No.: PCT/KR2020/003080
§ 371 (c)(1),
(2) Date: Aug. 26, 2021

(87) PCT Pub. No.: WO2020/180113
PCT Pub. Date: Sep. 10, 2020

(65) Prior Publication Data
US 2022/0150092 A1     May 12, 2022

(30) Foreign Application Priority Data

Mar. 5, 2019   (KR) .......................  10-2019-0025339

(51) Int. Cl.
*H04L 25/02*   (2006.01)
*H04L 61/5084*   (2022.01)
(Continued)

(52) U.S. Cl.
CPC ...... *H04L 25/0204* (2013.01); *H04L 61/5084* (2022.05); *H04L 69/14* (2013.01);
(Continued)

(58) Field of Classification Search
CPC ............. H04L 25/0202; H04L 25/0204; H04L 61/5084; H04M 1/72412; H04W 4/80; H04W 40/24; H04W 76/14; H04W 76/15
See application file for complete search history.

(56) References Cited

U.S. PATENT DOCUMENTS 7,853,348 B2   12/2010   Weinzierl
8,554,143 B2   10/2013   Camuffo et al.
(Continued)

FOREIGN PATENT DOCUMENTS

KR   10-2012-0128928 A   11/2012
KR   10-2014-0017889 A   2/2014
(Continued)

OTHER PUBLICATIONS

Extended European Search Report dated Oct. 14, 2022.
Korean Office Action dated Oct. 27, 2023.

*Primary Examiner* — Pao Sinkantarakorn
(74) *Attorney, Agent, or Firm* — Cha & Reiter, LLC

(57) ABSTRACT

An electronic device is disclosed. The electronic device includes a wireless communication circuit, a processor operatively connected to the wireless communication circuit, and a memory operatively connected to the processor. The processor executes a method, including establishing a first link with a first external electronic device using the wireless communication circuit, establishing a second link with a second external electronic device using the wireless communication circuit, determining whether to share, with the second external electronic device, first link information for establishing a channel of the first link based at least on information of the second external electronic device and (Continued)

information of the first external electronic device, transmitting the first link information to the second external electronic device via the second link based on the determination, and transmitting a data packet to the first external electronic device via the first link.

12 Claims, 10 Drawing Sheets

(51) Int. Cl.
    *H04L 69/14*     (2022.01)
    *H04W 4/80*     (2018.01)
    *H04W 40/24*     (2009.01)
    *H04W 76/14*     (2018.01)
    *H04W 76/15*     (2018.01)

(52) U.S. Cl.
    CPC ............ *H04W 4/80* (2018.02); *H04W 40/24* (2013.01); *H04W 76/14* (2018.02); *H04W 76/15* (2018.02)

(56) References Cited

U.S. PATENT DOCUMENTS

| | | | |
|---|---|---|---|
| 8,768,252 B2 | 7/2014 | Watson et al. | |
| 8,774,715 B2 | 7/2014 | Kwon et al. | |
| 9,020,437 B2 | 4/2015 | Watson et al. | |
| 9,621,987 B2 | 4/2017 | Watson et al. | |
| 9,788,117 B2 | 10/2017 | Watson et al. | |
| 9,794,393 B2 | 10/2017 | Hsieh | |
| 9,913,079 B2 | 3/2018 | Srivatsa et al. | |
| 10,104,474 B2 | 10/2018 | Watson et al. | |
| 10,419,912 B2 | 9/2019 | Srivatsa et al. | |
| 2007/0037517 A1 | 2/2007 | Camuffo et al. | |
| 2007/0198122 A1 | 8/2007 | Weinzierl | |
| 2012/0058727 A1 | 3/2012 | Cook et al. | |
| 2012/0295541 A1 | 11/2012 | Kwon et al. | |
| 2014/0329468 A1 | 11/2014 | Watson et al. | |
| 2015/0065049 A1 | 3/2015 | Heo et al. | |
| 2015/0296468 A1 | 10/2015 | Dural et al. | |
| 2015/0304770 A1 | 10/2015 | Watson et al. | |
| 2015/0319557 A1 | 11/2015 | El-Hoiydi | |
| 2016/0316051 A1 | 10/2016 | Hsieh | |
| 2016/0360341 A1 | 12/2016 | Srivatsa et al. | |
| 2017/0188152 A1 | 6/2017 | Watson et al. | |
| 2018/0077493 A1 | 3/2018 | Watson et al. | |
| 2018/0176717 A1* | 6/2018 | Fu | H04W 4/80 |
| 2018/0199176 A1 | 7/2018 | Srivatsa et al. | |
| 2018/0295565 A1 | 10/2018 | Lee et al. | |
| 2019/0037312 A1 | 1/2019 | Watson et al. | |
| 2020/0008035 A1 | 1/2020 | Srivatsa et al. | |
| 2020/0107387 A1* | 4/2020 | Li | H04B 17/318 |
| 2020/0162851 A1* | 5/2020 | Wilde | G02B 27/017 |
| 2020/0196372 A1* | 6/2020 | Ouyang | H04R 5/04 |
| 2021/0282073 A1 | 9/2021 | Lee et al. | |
| 2021/0377713 A1* | 12/2021 | Wei | H04W 52/0219 |

FOREIGN PATENT DOCUMENTS

| | | |
|---|---|---|
| KR | 10-2017-0076527 A | 7/2017 |
| KR | 10-2019-0008434 A | 1/2019 |

\* cited by examiner

METHOD FOR SHARING CHANNEL INFORMATION IN BLUETOOTH NETWORK, AND ELECTRONIC DEVICE THEREFOR

CROSS REFERENCE TO RELATED APPLICATIONS

This application is a National Phase Entry of PCT International Application No. PCT/KR2020/003080, which was filed on Mar. 4, 2020, and claims a priority to Korean Patent Application No. 10-2019-0025339, which was filed on Mar. 5, 2019, the contents of which are incorporated herein by reference.

TECHNICAL FIELD

Certain embodiments of the present disclosure relate to a method for sharing channel information in a Bluetooth network and an electronic device therefor.

BACKGROUND ART

A Bluetooth technology standard stipulated by the Bluetooth Special Interest Group (SIG) defines a protocol for short range wireless communication between electronic devices. In a Bluetooth network environment, electronic devices may transmit or receive data packets including content such as text, voice, image, or video at a specified frequency band (e.g., about 2.4 gigahertz (GHz)).

For example, a user device (e.g., mobile phone) may transmit data packets including content (e.g., music) to an external electronic device connected to the user device in a Bluetooth network environment. For example, the external electronic device may include at least one of an earphone (e.g., earbuds), a headset, a speaker, a mouse, a keyboard, or a display device. For example, the user may transmit data packets to a plurality of external electronic devices using the user device.

DISCLOSURE OF THE INVENTION

Technical Problem

A topology representing a Bluetooth network environment may include a plurality of electronic devices. For example, a user device (e.g., smartphone) may communicate with a first device and a second device via a Bluetooth network. The first device and the second device may be a pair of wireless earphones (e.g., earbuds). For example, the user may wear the first device on a left ear of the user and the second device on a right ear of the user. The user device may transmit data packets to the first device and the second device.

The user device may be connected to each of the first device and the second device in order to transmit data packets to the first device and the second device. In order to be connected to each of the first device and the second device, the user device may support multi-connection based on Bluetooth communication. Furthermore, the user may perform connection procedures for each of the first device and the second device. In addition, since the user device transmits data packets via a plurality of links, power consumption may increase, and efficiency of radio resources may decrease.

Certain embodiments disclosed in the present disclosure may provide an electronic device and a method for overcoming the above-described limitation in a Bluetooth network environment.

Technical Solution

An electronic device according to an embodiment of the present disclosure includes a wireless communication circuit, a processor operatively connected to the wireless communication circuit, and a memory operatively connected to the processor, wherein the memory stores one or more instructions that, when executed, cause the processor to establish a first link with a first external electronic device using the wireless communication circuit, establish a second link with a second external electronic device using the wireless communication circuit, determine whether to share, with the second external electronic device, first link information for estimating a channel of the first link based at least on information of the second external electronic device and information of the first external electronic device, transmit the first link information to the second external electronic device via the second link based on the determination, and transmit a data packet to the first external electronic device via the first link.

An electronic device according to an embodiment of the present disclosure includes a wireless communication circuit, a processor operatively connected to the wireless communication circuit, and a memory operatively connected to the processor, wherein the memory stores one or more instructions that, when executed, cause the processor to establish a first link with a user device using the wireless communication circuit, receive information from the user device regarding an external device communicably connected to the user device using the wireless communication circuit, determine whether to share, with the external electronic device, first link information for establishing a channel of the first link at least partially based on the information of the external electronic device and information of the electronic device, and transmit, based on the determination, a sharing request to the user device via the first link, to cause the user device to transmit the first link information to the external device.

An electronic device according to an embodiment of the present disclosure includes a wireless communication circuit, a processor operatively connected to the wireless communication circuit, and a memory operatively connected to the processor, wherein the memory stores one or more instructions that, when executed, cause the processor to create a second link with a user device using the wireless communication circuit, transmit, to the user device via the second link, a signal requesting information of an electronic device connected to the user device using the wireless communication circuit, receive information of an external device connected to the user device via a first link from the user device using the wireless communication circuit, determine whether to request to share, with the external electronic device, first link information for estimating a channel of the first link at least partially based on the information of the external electronic device and information of the electronic device, transmit, based on the determination, a signal requesting to share the first link information to the user device via the second link, and, upon receiving the first link information from the user device, monitor a data packet transmitted from the user device to the external device via the first link using the first link information.

Advantageous Effects

According to certain embodiments of the present disclosure, an electronic device may reduce radio resource consumption in a Bluetooth network environment.

According to certain embodiments of the present disclosure, an electronic device may enhance security pertaining to sharing of wireless data.

Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

MODE FOR CARRYING OUT THE INVENTION

Hereinafter, certain embodiments of the present disclosure will be described in detail with reference to the accompanying drawings. However, it should be understood that the present disclosure is not limited to specific embodiments, but rather includes various modifications, equivalents and/or alternatives of certain embodiments of the present disclosure.

Figure 1:
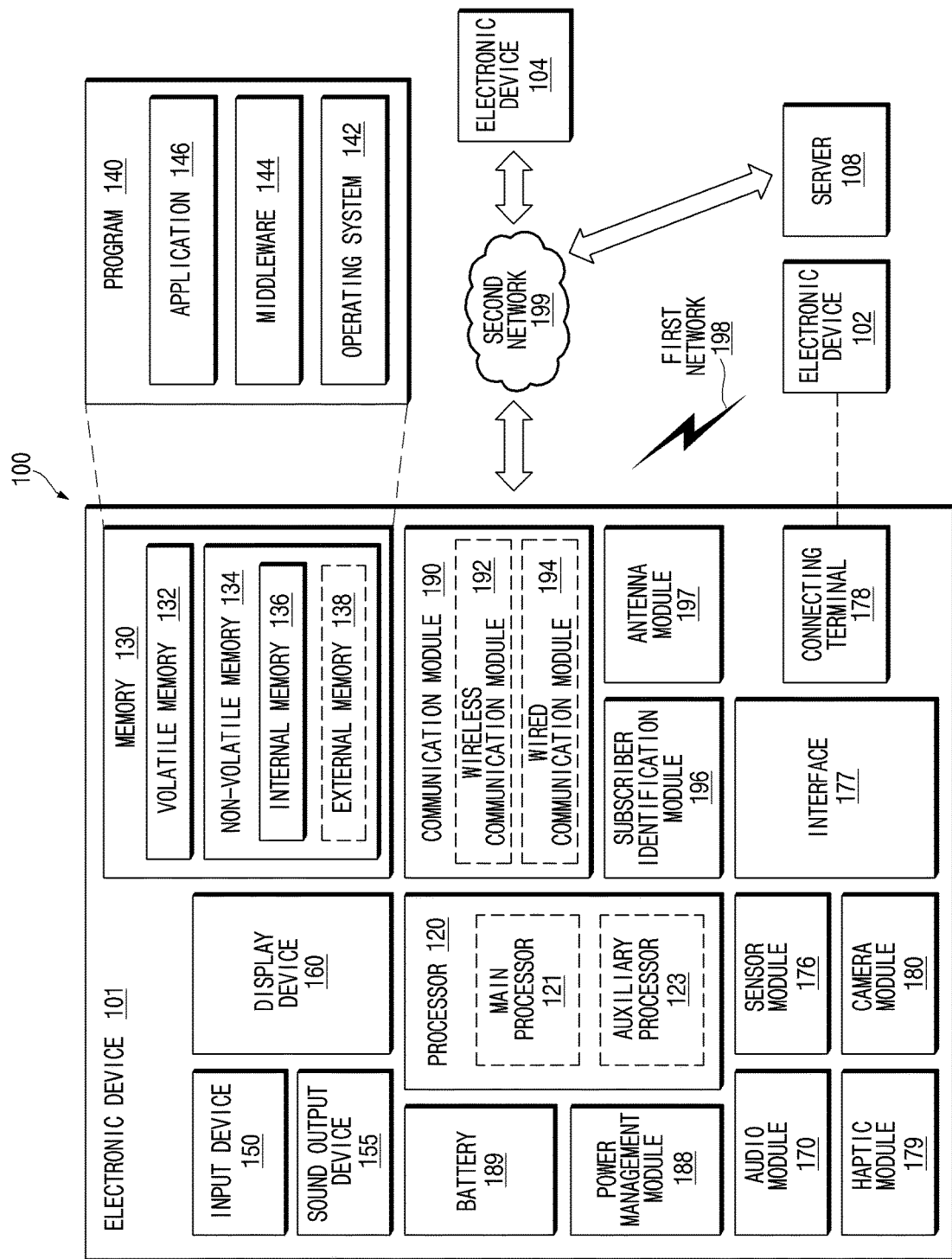
FIG. 1 is a block diagram illustrating an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
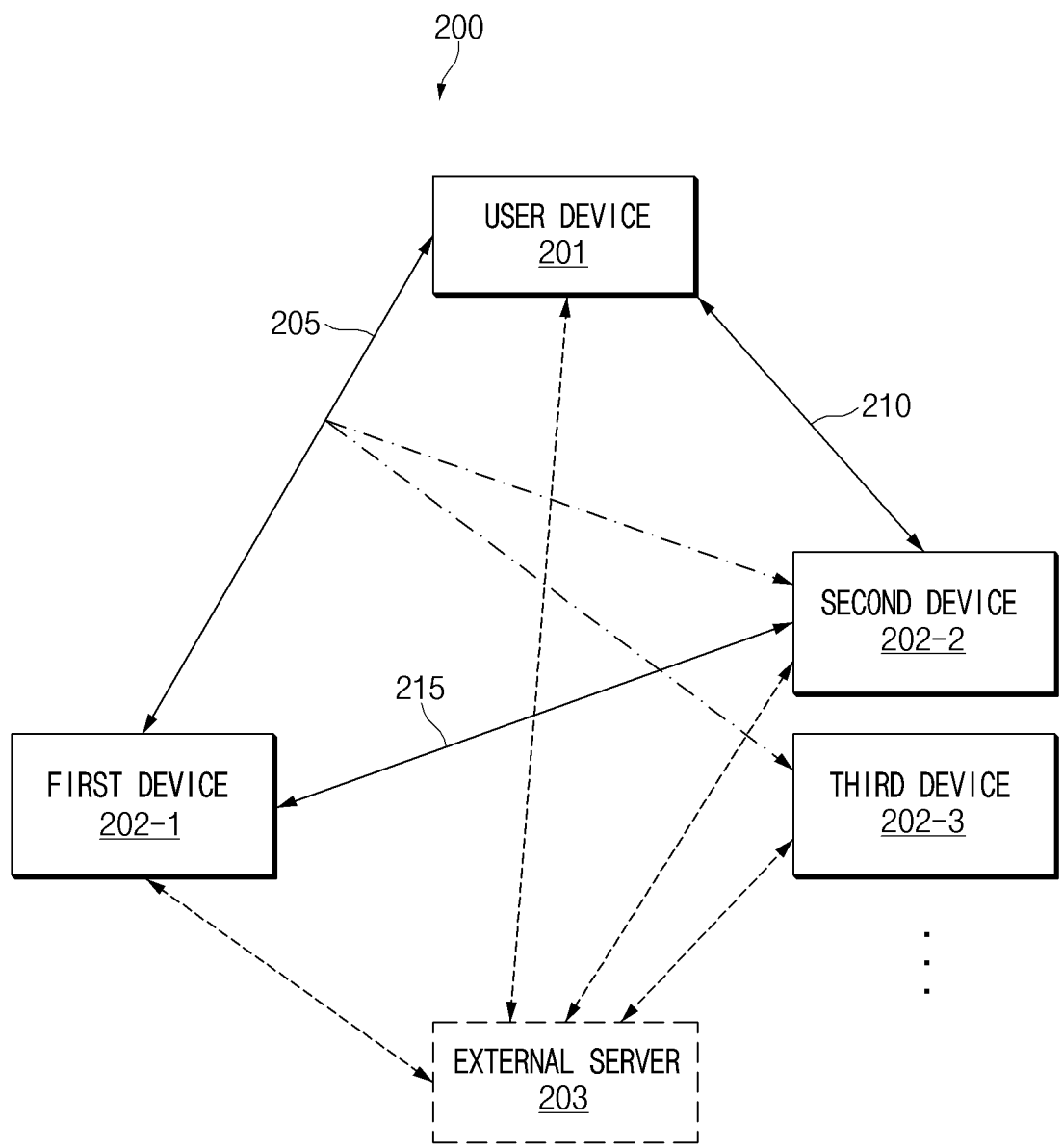
FIG. 2 is a diagram illustrating a topology in a Bluetooth network environment according to certain embodiments.

FIG. 2 illustrates a topology 200 of a Bluetooth network environment according to certain embodiments.

Referring to FIG. 2, the devices (e.g., 201, 202-1, 202-2, and 202-3) included in the topology 200 may include components, at least some of which are the same as or similar to those of the electronic device 101 illustrated in FIG. 1, and may execute functions, at least some of which are the same as or similar to those of the electronic device 101. For example, the devices (e.g., 201, 202-1, 202-2, and 202-3) may perform wireless communication at a short range according to a Bluetooth network defined by the Bluetooth SIG. The Bluetooth network may include, for example, a Bluetooth legacy network and a Bluetooth low energy (BLE) network. According to an embodiment, the devices (e.g., 201, 202-1, 202-2, and 202-3) may perform wireless communication via one or both of the Bluetooth legacy network and the BLE network.

According to an embodiment, the user device 201 may operate as a data source device. For example, the user device 201 may be an electronic device, which transmits media data such as music to another electronic device connected to the user device 201. According to an embodiment, the first device 202-1, the second device 202-2, and the third device 202-3 may be configured to output media data (e.g., audio signal). For example, the user device 201 may include, a user terminal such as a smartphone, a tablet computer, a desktop computer, or a laptop computer, and the other devices 202-1, 202-2, and 202-3 may include an accessory device such as an earphone, a headset, a speaker, a mouse, a keyboard, or a display device.

According to an embodiment, the user device 201 may be connected to one or more external devices (e.g., the first device 202-1, the second device 202-2, and/or the third device 202-3) based on a Bluetooth communication protocol. For example, the user device 201 may be connected to an external device by exchanging information with the external device according to a specified sequence. When connecting to a plurality of external devices, the user device 201 may perform a connection operation with each of the plurality of external devices.

For example, the user device 201 may recognize the first device 202-1 using wireless communication (e.g., Bluetooth (e.g., Bluetooth legacy and/or BLE)). The user device 201 may recognize the first device 202-1 by receiving an advertising signal broadcast or multicast by the first device 202-1. For example, the first device 202-1 may transmit an advertising signal including information related to a connection or a connection request. For example, the advertising signal may include at least one of identification information about the first device 202-1, user's account information, information indicating whether another device is currently paired, information about a device capable of being simultaneously paired, or information about transmission power, sensing area, or battery remaining capacity. The user device 201 may perform a connection operation with the recognized first device 202-1 based on a Bluetooth or BLE protocol. For example, the user device 201 may recognize the first device 202-1 based on the Bluetooth and/or BLE protocol and may perform a connection operation with the first device 202-1 based on the Bluetooth or BLE protocol.

According to an embodiment, upon receiving the advertising signal, the user device 201 may output, to a display, a user interface for connecting to the first device 202-1. For example, the user interface may include identification information about an identified device (e.g., the first device 202-1). For example, the user interface may include an indicator indicating whether the identified device has been paired with the user device 201 in the past. For example, the user interface may include information about a user account associated with the user device 201 and/or the first device 202-1.

For example, upon receiving a user input (e.g., Bluetooth function activation input), the user device 201 may identify another electronic device and may provide identified electronic device information to a user. The user device 201 may perform connection with an external electronic device (e.g., the first device 202-1) based on a user input (e.g., input for selecting a connection device) to at least one of identified electronic devices. For example, the user device 201 may transmit a connection request to the selected first device 202-1 and may connect to the first device 202-1 upon receiving an acceptance response from the first device 202-1.

According to an embodiment, when connected to the first device 202-1, the user device 201 may transmit information associated with the first device 202-1 to an external server 203 (e.g., Internet-of-things (IoT) server or Samsung Connect™ server). For example, when the user device 201 is connected to, among other external electronic devices linked with an account of the user device 201, the first device 202-1 for the first time, the user device 201 may register information about the connected first device 202-1 in the external server 203. For another example, if the user device 201 has been connected to the first device 202-1 in the past, the user device 201 may transmit state information associated with the first device 202-1 and/or first link 205 to the external server 203. For example, the user device 201 may manage other electronic devices based on an account (e.g., user account associated with the user device 201) using information of the external server 203. According to an embodiment, the user device 201 may store, in a memory, information about a connected device (e.g., the first device 202-1) and/or link (e.g., the first link 205). For example, the user device 201 may store information of the first device 202-1 in a memory or update the same.

According to an embodiment, the user device 201 may receive information of another electronic device from the external server 203. For example, the second device 202-2 may be connected to the first device 202-1 via a third link 215, and may transmit information of the first device 202-1 to the external server 203. The user device 201 may receive, from the external server 203, the information of the first device 202-1 transmitted from the second device 202-2. For example, the user device 201, the first device 202-1, and the second device 202-2 may be electronic devices associated with the same account in the external server 203.

According to an embodiment, the user device 201 may transmit data to a connected external device. For example, the user device 201 may transmit data to the first device 202-1 via the first link 205. The user device 201 or the first device 202-1 may be configured as a master device during a connection procedure. For example, in the case of legacy Bluetooth communication, the user device 201 may transmit data using a channel resource (e.g., frequency hopping channel) generated based on a clock of a master device of the first link 205. For another example, in the case of BLE communication, the user device 201 may transmit data to the first device 202-1 in each connection interval. According to an embodiment, the first device 202-1 may receive data from the user device 201 via the first link 205. For example, the first device 202-1 may transmit, to the user device 201, acknowledgement (ACK)/negative ACK (NACK) at least partially based on the data received via the first link 205. The first device 202-1 may transmit ACK/NACK to the user device 201 via the first link 205.

According to an embodiment, the user device 201 may form the first link 205 with the first device 202-1, and may transmit a data packet via the first link 205. For example, at least one other electronic device (e.g., the second device 202-2 and/or the third device 202-3) may monitor the first link 205 in order to receive (e.g., listen for) a data packet transmitted from the user device 201 to the first device 202-1 via the first link 205. In this case, the user device 201 unicasts data to the first device 202-1, but the data transmitted from the user device 201 may be received by not only the first device 202-1 but also another electronic device (e.g., the second device 202-2 and/or the third device 202-3).

Hereinafter, the second device 202-2 is described as monitoring the first link 205, but embodiments of the present disclosure are not limited thereto. Another electronic device (e.g., the third device 202-3) may also monitor the first link 205 in a manner similar to that in which the second device 202-2 monitors the first link 205.

According to an embodiment, the user device 201 may be connected to the second device 202-2 based on a Bluetooth protocol. For example, the user device 201 may be connected to the second device 202-2 via a second link 210. According to an embodiment, the user device 201 may transmit first link information to the second device 202-2 via the second link 210. The second device 202-2, for example, upon receiving the first link information, may transmit ACK/NACK for the first link information to the user device 201 via the second link 210. For example, the first link information may include information of the first link 205 for the second device 202-2 to receive data transferred via the first link 205. For example, the first link information may include address information (e.g., the Bluetooth address of the master device of the first link 205, the Bluetooth address of the user device 201, and/or the Bluetooth address of the first device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information. The first link information may further include, for example, an extended inquiry response (EIR) packet. The EIR packet may include resource control information about the first link 205 and/or information about a manufacturer.

According to an embodiment, the second device 202-2 may receive (e.g., listen on) communication between the user device 201 and the first device 202-1 via the first link 205 using the first link information. For example, the second device 202-2 may determine a first link 205 hopping channel (or frequency hopping channel) using the first link information, and may decrypt encrypted data packets through key information.

According to an embodiment, the first device 202-1 may transmit a response message to the user device 201 in order to notify that a data packet has been received normally. The response message may include a positive acknowledgement (ACK) message indicating that the data packet has been received normally or a negative acknowledgement (NACK) message indicating that the data packet has not been received normally. The response message may include, for example, 1-bit information. If an ACK message is received after transmitting a data packet, the user device 201 may transmit a next data packet, and if a NACK message is received or a response message is not received within a specified time, the user device 201 may retransmit the same data packet.

According to an embodiment, the first device 202-1 may transmit the response message to the user device 201 based on ACK/NACK from the second device 202-2. For example, the second device 202-2 may monitor a data packet transmitted from the user device 201 via the first link 205, and may transmit a reception result of the transmitted data packet to the first device 202-1 via the third link 215. For example, the second device 202-2 may transmit ACK to the first device 202-1 via the third link 215 if the data packet is successfully received from the user device 201, and may transmit NACK to the first device 202-1 via the third link 215 if the data packet is not successfully received. When NACK is received from the second device 202-2, the first device 202-1 may transmit a response message including NACK to the user device 201 via the first link 205. When data is not successfully received from the user device 201, the first device 202-1 may transmit a response message including NACK to the user device 201 via the first link 205. The first device 202-1 may transmit a response message including ACK to the user device 201 via the first link 205 specifically when data is successfully received from the user device 201 and ACK for the data is received from the second device 202-2.

According to an embodiment, the second device 202-2 may transmit a response message to the user device 201 based on ACK/NACK from the first device 202-1. For example, the first device 202-1 may transmit a reception result of a data packet transmitted via the first link 205 to the second device 202-2 via the third link 215. For example, the first device 202-1 may transmit ACK to the second device 202-2 via the third link 215 if the data packet is successfully received from the user device 201, and may transmit NACK to the second device 202-2 via the third link 215 if the data packet is not successfully received. For another example, the first device 202-1 may not transmit ACK to the second device 202-2 if the packet is not successfully received. When NACK is received or ACK is not received from the first device 202-1, the second device 202-2 may transmit a response message including NACK to the user device 201 via the second link 210. When data is not successfully received from the user device 201, the second device 202-2 may transmit a response message including NACK to the user device 201 via the second link 210. The second device 202-2 may transmit a response message including ACK to the user device 201 via the second link 210 specifically when data is successfully received from the user device 201 and ACK for the data is received from the first device 202-1.

According to an embodiment, the first device 202-1 and the second device 202-2 may transmit ACK/NACK at different timings. For example, the first device 202-1 and the second device 202-2 may be configured to transmit ACK/NACK for data from the user device 201 at different timings within one time interval (e.g., slot or time interval). The first device 202-1 and the second device 202-2 may transmit ACK/NACK to the user device 201 using different sub-slots among a plurality of sub-slots including one slot. The first device 202-1 and the second device 202-2 may transmit ACK/NACK at non-overlapping timings within one time interval (e.g., time interval set for data transmission). For example, the first device 202-1 and the second device 202-2 may transmit ACK/NACK using the first link 205 or the second link 210.

According to an embodiment, the second device 202-2 may transmit NACK using a time margin interval (e.g., Rx cycle) set between slots. For example, if reception of data from the user device 201 succeeds, the second device 202-2 may not transmit ACK and NACK within the time margin interval. In this case, the first device 202-1 may transmit ACK to the user device 201 via the first link 205 after elapse of the time margin interval. For another example, if reception of data from the user device 201 fails, the second device 202-2 may transmit NACK to the user device 201 within the time margin interval. Therefore, the second device 202-2 may transmit NACK to the user device 201 prior to the first device 202-1 when data is not successfully received from the user device 201.

According to an embodiment, the types of response messages associated with the first link 205 and the second link 210 may be different from each other. For example, if data is successfully received from the user device 201, the first device 202-1 may transmit ACK to the second device 202-2. In this case, the second device 202-2 may transmit a message (e.g., message corresponding to ACK) to the user device 201 via the second link 210 if ACK is received from the first device 202-1 and data is successfully received from the user device 201. For another example, the second device 202-2 may transmit no message to the user device 201 if ACK is received from the first device 202-1 but reception of data from the user device 201 fails. For another example, the first device 202-1 may transmit a message (e.g., message corresponding to NACK) to the user device 201 via the first link 205 if reception of data from the user device 201 fails. In this case, the second device 202-2 may transmit no message to the user device 201. Therefore, the user device 201 may receive a message associated with ACK via the second link 210, and may receive a message associated with NACK via the first link 205. The user device 201 may recognize a case corresponding to NACK even if there is no response.

According to an embodiment, the first device 202-1 and the second device 202-2 may alternately transmit ACK/NACK. For example, ACK/NACK for first data from the user device 201 may be transmitted by the first device 202-1, and ACK/NACK for subsequent second data may be transmitted by the second device 202-2. For example, a device (e.g., the first device 202-1 or the second device 202-2) configured to transmit ACK/NACK may collect ACK/NACK from another device (e.g., the second device 202-2 or the first device 202-1) and transmit the collected ACK/NACK to the user device 201.

According to an embodiment, the first device 202-1 and the second device 202-2 may transmit ACK/NACK with different powers using the same link (e.g., the first link 205). For example, the first device 202-1 may transmit ACK/NACK to the user device 201 with higher transmission power than that of the second device 202-2. The user device 201 may be unable to receive ACK/NACK of the second device 202-2. For another example, the second device 202-2 may transmit ACK/NACK to the user device 201 with higher transmission power than that of the first device 202-1. The user device 201 may be unable to receive ACK/NACK of the first device 202-1. For example, lower transmission power among the transmission powers of the first device 202-1 and the second device 202-2 may be transmission power that may be unable to be received by the user device 201. For another example, lower transmission power among the transmission powers of the first device 202-1 and the second device 202-2 may be transmission power that may be unable to be received by the user device 201 but may be able to be received by another device (e.g., the first device 202-1 or the second device 202-2).

According to certain embodiments, when the first device 202-1 and/or the second device 202-2 fail to receive data from the user device 201, the data may be retransmitted. According to an embodiment, the user device 201 may retransmit data in response to reception of NACK or non-reception of ACK. According to an embodiment, the first device 202-1 or the second device 202-2 may perform retransmission. For example, when the first device 202-1 has received data from the user device 201 but the second device 202-2 fails to receive data, the first device 202-1 may retransmit the data to the second device 202-2 via the third link 215. For another example, when the second device 202-2 has received data from the user device 201 but the first device 202-1 fails to receive data, the second device 202-2 may retransmit the data to the first device 202-1 via the third link 215.

For example, the user device 201 or the second device 202-2 may disconnect the second link 210 after transmitting the first link information. For another example, the user device 201 or the second device 202-2 may maintain a connection to the second link 210 even after transmitting the first link information.

In the above-mentioned examples, the first link information may be transmitted from the user device 201 to the second device 202-2. A device having the first link information may monitor (e.g., listen on) data transmitted/received via the first link 205. Therefore, in order to prevent an unwanted device from eavesdropping on the first link 205, the user device 201 may prudently determine whether to share the first link information. Hereinafter, methods for sharing first link information according to certain embodiments will be described. As described above, the methods for sharing first link information described below may be similarly applied to other electronic devices (e.g., the third device 202-3). Furthermore, the first device 202-1 and the second device 202-2 are distinguished from each other for convenience, and embodiments of the present disclosure are not limited thereto. For example, the first device 202-1 may perform the embodiments of the present disclosure related to the second device 202-2. The second device 202-2 may perform the embodiments of the present disclosure related to the first device 202-1.

Figure 3:
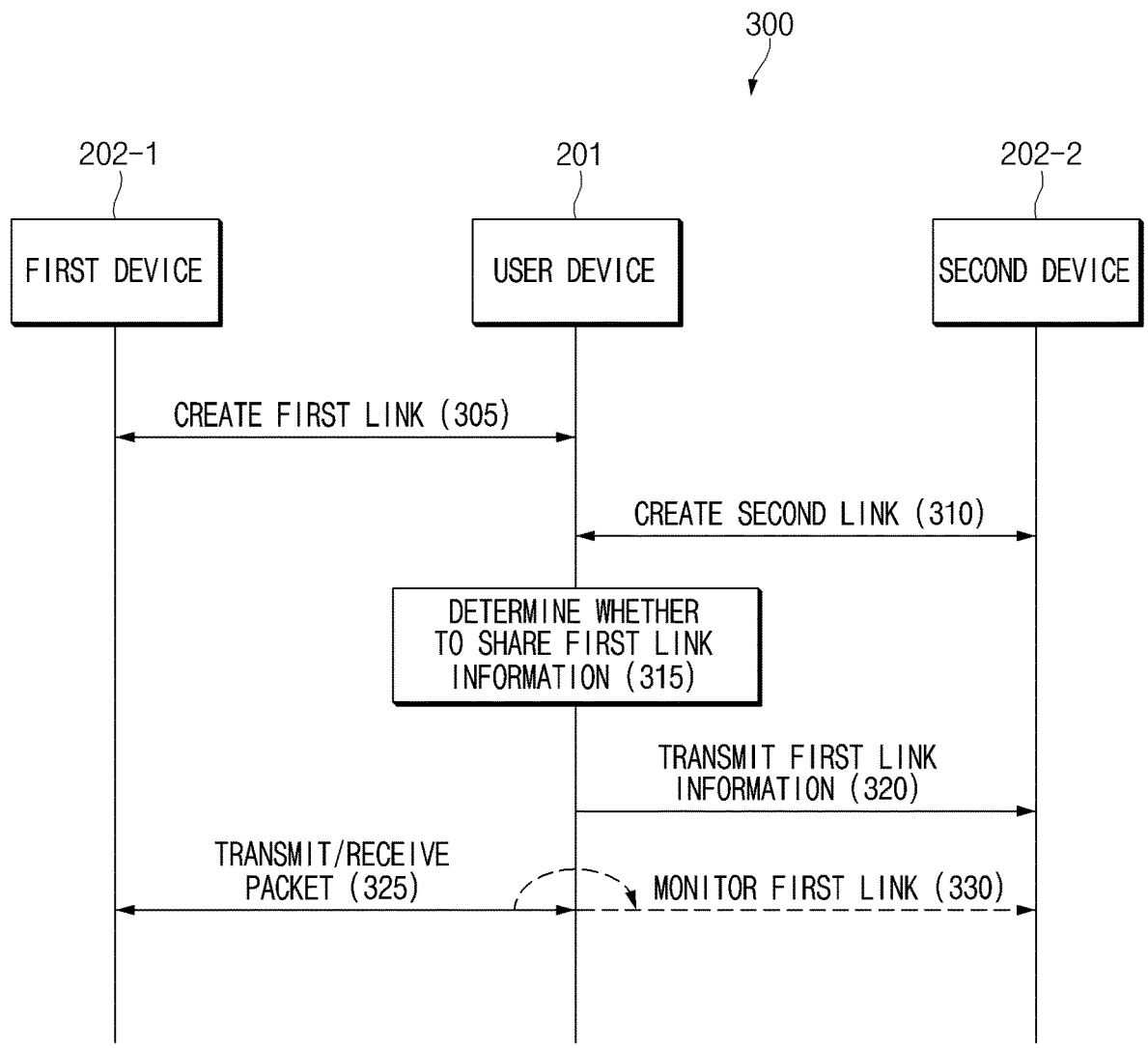
FIG. 3 is a signal flowchart illustrating a link information sharing method based on determination of a user device according to an embodiment.

FIG. 3 is a signal flowchart 300 illustrating a link information sharing method based on determination of a user device according to an embodiment.

According to an embodiment, in operation 305, the first device 202-1 and the user device 201 may establish a first link (e.g., the first link 205 of FIG. 2) for communication. The descriptions provided above with reference to FIG. 2 apply to a procedure for creating the first link 205.

According to an embodiment, in operation 310, the user device 201 and the second device 202-2 may establish a second link (e.g., the second link 210 of FIG. 2) for communication. For example, a creation procedure of the second link 210 may be similar to the creation procedure of the first link 205. For another example, the second link 210 may be configured in a different manner from that in which the first link 205 is configured. The user device 201 and the second device 202-2 may create the second link 210 based on a communication protocol that is different from that of the first link 205.

Although operation 310 is performed after operation 305 in FIG. 3, embodiments of the present disclosure are not limited thereto. For example, the first link 205 may be created after the second link 210 is created. For another example, the first link 205 and the second link 210 may be created substantially simultaneously.

According to certain embodiments, in operation 315, the user device 201 may determine whether to share first link information with the second device 202-2. The user device 201 may determine whether to share the first link information with the second device 202-2 at least partially based on a name, address, supported feature, manufacturer, sharing request, setting, sharing history, and/or account. For example, the user device 201 may obtained the foregoing pieces of information while creating the first link 205 and the second link 210.

According to an embodiment, the user device 201 may determine whether to share the first link information at least partially based on identification information (e.g., name) of the first device 202-1 and the second device 202-2. For example, the user device 201 may determine whether to share the first link information at least partially based on similarity and/or regularity of the identification information between the first device 202-1 and the second device 202-2. For example, if the first device 202-1 has a name of AAA_left and the second device 202-2 has a name of AAA_Right, the user device 201 may recognize that the first device 202-1 and the second device 202-2 are electronic devices supporting the same service based on the identification information. The user device 201 may determine that the first device 202-1 and the second device 202-2 are electronic devices providing the same service based on the similarity (e.g., AAA) and/or regularity (e.g., left and right) of the names between the first device 202-1 and the second device 202-2. If the first device 202-1 and the second device 202-2 are determined to be electronic devices providing the same service, the user device 201 may determine to share the first link information with the second device 202-2.

According to an embodiment, the user device 201 may determine whether to share the first link information at least partially based on addresses (e.g., Bluetooth address) of the first device 202-1 and the second device 202-2. For example, a Bluetooth address may be configured with 6 bytes. The Bluetooth address may be configured with 2-byte non-significant address part (NAP), 1-byte upper address part (UAP), and 3-byte lower address part (LAP). For example, the NAP and UAP may include manufacturer identification information (e.g., organizationally unique identifier (OUI)). For example, the LAP may be a value specified by a manufacturer. The user device 201 may determine to share the first link information with the second device 202-2 if the first device 202-1 and the second device 202-2 have the same manufacturer identification information and similar LAP values. For example, the user device 201 may share the first link information with the second device 202-2 if the addresses of the first device 202-1 and the second device 202-2 indicate the same manufacturer and a difference of the LAPs falls within a preset range.

According to an embodiment, the user device 201 may determine whether to share the first link information at least partially based on at least one of supported features or manufacturers of the first device 202-1 and the second device 202-2. For example, the user device 201 may identify the first device 202-1 and the second device 202-2 as electronic devices supporting the same service by using supported feature information of each of the first device 202-1 and the second device 202-2, and may determine to share the first link information with the second device 202-2 that supports the same service. For example, the user device 201 may identify the first device 202-1 and the second device 202-2 as electronic devices supporting the same service by using information about manufacturers of the first device 202-1 and the second device 202-2, and may determine to share the first link information with the second device 202-2 that supports the same service. For another example, the user device 201 may identify the first device 202-1 and the second device 202-2 as electronic devices supporting the same service by using the supported feature information and manufacturer information of the first device 202-1 and the second device 202-2, and may determine to share the first link information with the second device 202-2 that supports the same service.

According to an embodiment, the user device 201 may determine whether to share the first link information based on at least the identification information, addresses, supported features, and/or manufacturers of the first device 202-1 and the second device 202-2. For example, the user device 201 may determine whether to share the first link information using at least one of the identification information, addresses, supported features, and/or manufacturers. For another example, the user device 201 may determine whether to share the first link information using all of the identification information, addresses, supported features, and manufacturers.

According to an embodiment, the user device 201 may determine whether to share the first link information at least partially based on a request of the first device 202-1 or the second device 202-2. For example, the user device 201 may transmit the first link information to the second device 202-2 upon receiving a first link information sharing request to the second device 202-2 from the first device 202-1. For another example, the user device 201 may transmit the first link information to the second device 202-2 upon receiving the first link information sharing request from the second device 202-2. According to an embodiment, if the first device 202-1 and the second device 202-2 are connected via an additional link (e.g., the third link 215 of FIG. 2), the first device 202-1 or the second device 202-2 may transmit the first link information sharing request to the user device 201. According to an embodiment, even if the first device 202-1 and the second device 202-2 are not additionally connected, the first device 202-1 or the second device 202-2 may transmit the first link information sharing request to the user device 201 at an arbitrary time after connecting to the user device 201.

According to an embodiment, the user device 201 may determine to share a link between the first device 202-1 and the second device 202-2 at least partially based on a user setting. For example, the user device 201 may provide a list of connected and/or paired electronic devices to the user. The user device 201, for example, may receive an input related to link sharing between the first device 202-1 and the second device 202-2 through a user input. If the first device 202-1 and the second device 202-2 are connected to the user device 201, the user device 201 may determine whether to share a link based on setting information. For example, when the second device 202-2 is connected after the first link 205 with the first device 202-1 is created, the user device 201 may transmit the first link information to the second device 202-2 based on the setting information. For another example, when the first link 205 with the first device 202-1 is created after the second link 210 with the second device 202-2 is created, the user device 201 may transmit second link information of the second link 210 to the first device 202-1 based on the setting information.

According to an embodiment, the user device 201 may determine to share a link between the first device 202-1 and the second device 202-2 at least partially based on a sharing history. For example, if the first device 202-1 and the second device 202-2 have shared a link before, the user device 201 may transmit the first link information to the second device 202-2.

According to an embodiment, the user device 201 may determine to share a link at least partially based on account information associated with the first device 202-1 and the second device 202-2. For example, if the first device 202-1 and the second device 202-2 are associated with the same account (e.g., the same account of the external server 203), the user device 201 may determine to share a link. For another example, if a first account of the first device 202-1 and a second account of the second device 202-2 are associated accounts (e.g., accounts belonging to the same group), the user device 201 may determine to share a link. According to an embodiment, the user device 201 may obtain account information of the first device 202-1 and/or the second device 202-2 based on account information stored in a memory of the user device 201 or account information of the external server 203.

The user device 201 may provide a list of connected and/or paired electronic devices to the user. The user device 201, for example, may receive an input related to link sharing between the first device 202-1 and the second device 202-2 through a user input. For example, the user device 201 may transmit information about link sharing to an external server (e.g., the external server 203 of FIG. 2). If the first device 202-1 and the second device 202-2 are connected to the user device 201, the user device 201 may determine whether to share a link based on setting information. For example, when the second device 202-2 is connected after the first link 205 with the first device 202-1 is created, the user device 201 may transmit the first link information to the second device 202-2 based on the setting information. For another example, when the first link 205 with the first device 202-1 is created after the second link 210 with the second device 202-2 is created, the user device 201 may transmit second link information of the second link 210 to the first device 202-1 based on the setting information.

When the first link information is determined to be shared, the user device 201 may transmit the first link information to the second device 202-2 in operation 320. For example, the user device 201 may transmit the first link information to the second device 202-2 via the second link 210. For example, the first link information may include address information, piconet clock information, logical transport address information, used channel map information, link key information, SDP information, and/or supported feature information. The first link information may further include, for example, an EIR packet.

According to an embodiment, the user device 201 may transmit information about link sharing to an external server (e.g., the external server 203 of FIG. 2). For example, if the first link information is determined to be shared, the user device 201 may transmit the information about link sharing to the external server 203.

According to an embodiment, the user device 201 may communicate with the first device 202-1 via the first link 205 in operation 325. For example, the user device 201 may transmit (e.g., unicast) a data (e.g., data including media) packet to the first device 202-1 via the first link 205.

In operation 330, the second device 202-2 may monitor (e.g., listen on) the first link 205. According to an embodiment, the second device 202-2 may monitor the first link 205 using the first link information. For example, the second device 202-2 may monitor the first link 205 upon receiving an additional request from the user device 201 after continuously performing page scanning by using the Bluetooth address of the first device 202-1. According to another embodiment, the second device 202-2 may monitor the first link 205 upon receiving the first link information. The second device 202-2 may identify a hopping channel of the first link 205 using clock information and a Bluetooth address of a master device of the first link 205. The second device 202-2 may monitor the first link 205 using the identified hopping channel. For example, the second device 202-2 may open a radio frequency (RF) reception unit of the second device 202-2 in synchronization with a clock time of the master device of the first link 205, and may receive packets between the first device 202-1 and the user device 201 connected via the first link 205 by using the identified hopping channel.

Figure 4:
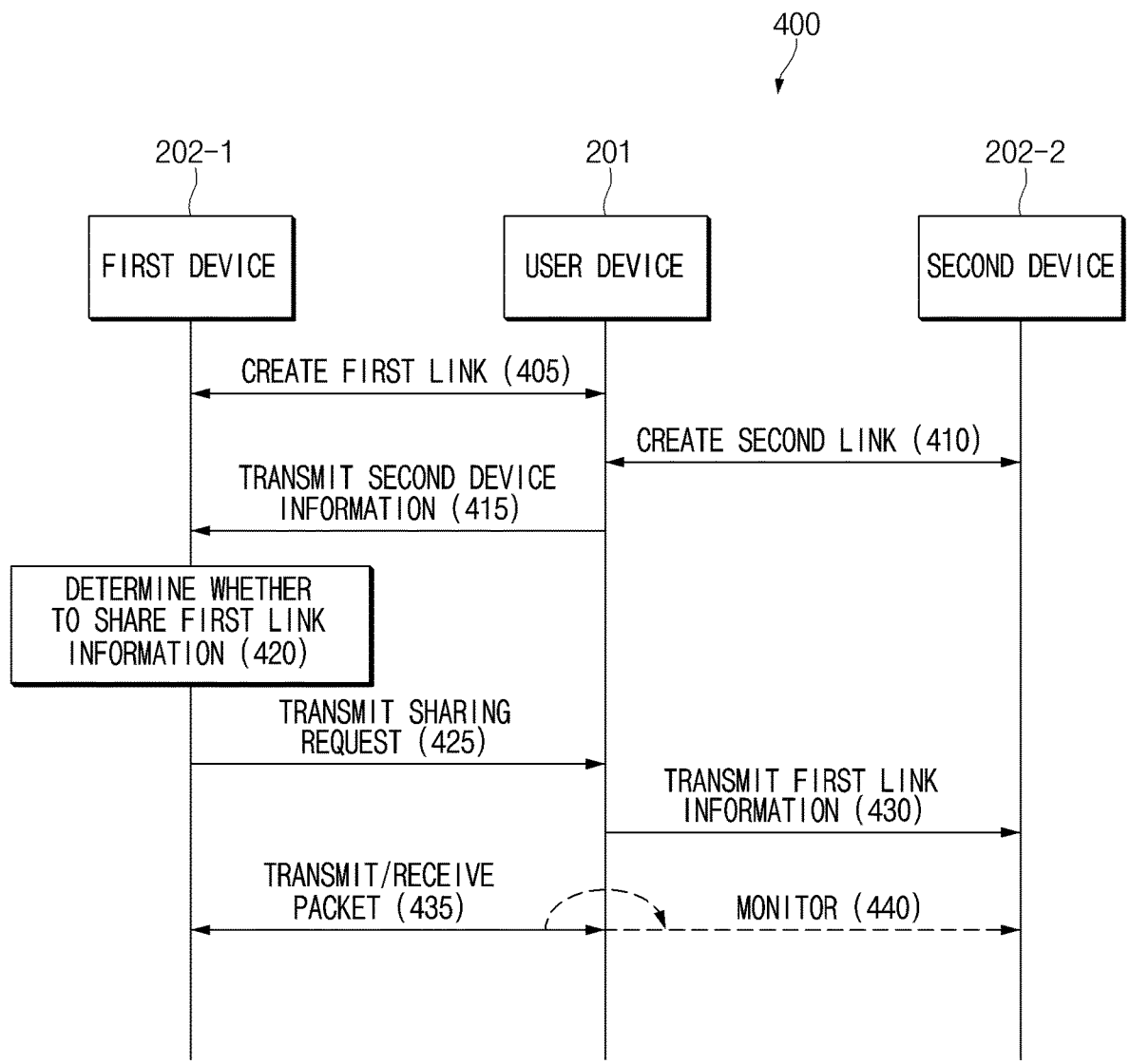
FIG. 4 is a signal flowchart illustrating a link information sharing method based on determination of a first device according to an embodiment.

FIG. 4 is a signal flowchart 400 illustrating a link information sharing method based on determination of the first device 202-1 according to an embodiment.

In operation 405, the first device 202-1 and the user device 201 may establish a first link (e.g., the first link 205 of FIG. 2) for communication. In operation 410, the user device 201 and the second device 202-2 may establish a second link (e.g., the second link 210 of FIG. 2) for communication. The above descriptions of operation 305 and operation 310 of FIG. 3 may be referenced for operation 405 and operation 410.

According to certain embodiments, in operation 415, the user device 201 may transmit information of the second device 202-2 to the first device 202-1. For example, if the user device 201 is connected to the second device 202-2, the user device 201 may transmit information regarding the second device 202-2 to the first device 202-1. For example, the user device 201 may transmit, to the first device 202-1, information of a plurality of electronic devices connected to the user device 201. For example, the information of the second device 202-2 may include at least one of the address of the second device 202-2, the identification information of the second device 202-2, and/or information about the manufacturer of the second device 202-2.

According to certain embodiments, in operation 420, the first device 202-1 may determine whether to share first link information to the second device 202-2. The first device 202-1 may determine to share the first link information at least partially based on a name, address, supported feature, manufacturer, and/or setting. For example, the first device 202-1 may obtain the foregoing pieces of information from the user device 201.

According to an embodiment, the first device 202-1 may determine whether to share the first link information at least partially based on identification information (e.g., name) of the first device 202-1 and the second device 202-2. For example, the first device 202-1 may determine whether to share the first link information at least partially based on similarity and/or regularity of the identification information between the first device 202-1 and the second device 202-2. For example, if the first device 202-1 has a name of AAA_left and the second device 202-2 has a name of AAA_Right, the first device 202-1 may identify that the first device 202-1 and the second device 202-2 are electronic devices supporting the same service based on the identification information. The first device 202-1 may determine that the first device 202-1 and the second device 202-2 are electronic devices providing the same service based on the similarity (e.g., AAA) and/or regularity (e.g., left and right) of the names between the first device 202-1 and the second device 202-2. If the first device 202-1 and the second device 202-2 are determined to be electronic devices providing the same service, the first device 202-1 may determine to share the first link information with the second device 202-2.

According to an embodiment, the first device 202-1 may determine whether to share the first link information at least partially based on addresses (e.g., Bluetooth address) of the first device 202-1 and the second device 202-2. For example, a Bluetooth address may be configured with 6 bytes. The first device 202-1 may determine to share the first link information with the second device 202-2 if the first device 202-1 and the second device 202-2 have the same manufacturer identification information and similar LAP values. For example, the first device 202-1 may determine to share the first link information with the second device 202-2 if the addresses of the first device 202-1 and the second device 202-2 indicate the same manufacturer and a difference of the LAPs falls within a preset range.

According to an embodiment, the first device 202-1 may determine whether to share the first link information at least partially based on at least one of supported features or manufacturers of the first device 202-1 and the second device 202-2. For example, the first device 202-1 may identify the first device 202-1 and the second device 202-2 as electronic devices supporting the same service by using supported feature information of each of the first device 202-1 and the second device 202-2, and may determine to share the first link information with the second device 202-2 that supports the same service. For example, the first device 202-1 may identify the first device 202-1 and the second device 202-2 as electronic devices supporting the same service by using information about manufacturers of the first device 202-1 and the second device 202-2, and may determine to share the first link information with the second device 202-2 that supports the same service. For another example, the first device 202-1 may identify the first device 202-1 and the second device 202-2 as electronic devices supporting the same service by using the supported feature information and manufacturer information of the first device 202-1 and the second device 202-2, and may determine to share the first link information with the second device 202-2 that supports the same service.

According to an embodiment, the first device 202-1 may determine whether to share the first link information based on at least the identification information, addresses, supported features, and/or manufacturers of the first device 202-1 and the second device 202-2. For example, the first device 202-1 may determine whether to share the first link information using at least one of the identification information, addresses, supported features, and/or manufacturers. For another example, the first device 202-1 may determine whether to share the first link information using all of the identification information, addresses, supported features, and manufacturers.

According to an embodiment, the first device 202-1 may determine to share the first link information at least partially based on a setting. For example, the second device 202-2 may be an electronic device configured to share a link with the first device 202-1. For example, the first device 202-1 may obtain a sharing setting from an external server (e.g., the external server 203), the user device 201, or a user input.

When determined to share the first link information, the first device 202-1 may transmit a sharing request to the user device 201 in operation 425. For example, the first device 202-1 may transmit the sharing request via the first link 205 (e.g., to request sharing of the first link information to the second device 202-2).

According to an embodiment, in operation 430, the user device 201 may transmit the first link information to the second device 202-2 upon receiving the sharing request. For example, the user device 201 may transmit the first link information to the second device 202-2 via the second link 210. For example, the first link information may include address information, piconet clock information, logical transport address information, used channel map information, link key information, SDP information, and/or supported feature information. The first link information may further include, for example, an EIR packet.

According to an embodiment, the user device 201 may communicate with the first device 202-1 via the first link 205 in operation 435. In operation 440, the second device 202-2 may monitor (e.g., listen on) the first link 205. The above descriptions of operations 325 and 330 of FIG. 3 may be referenced for operation 435 and operation 440.

Figure 5:
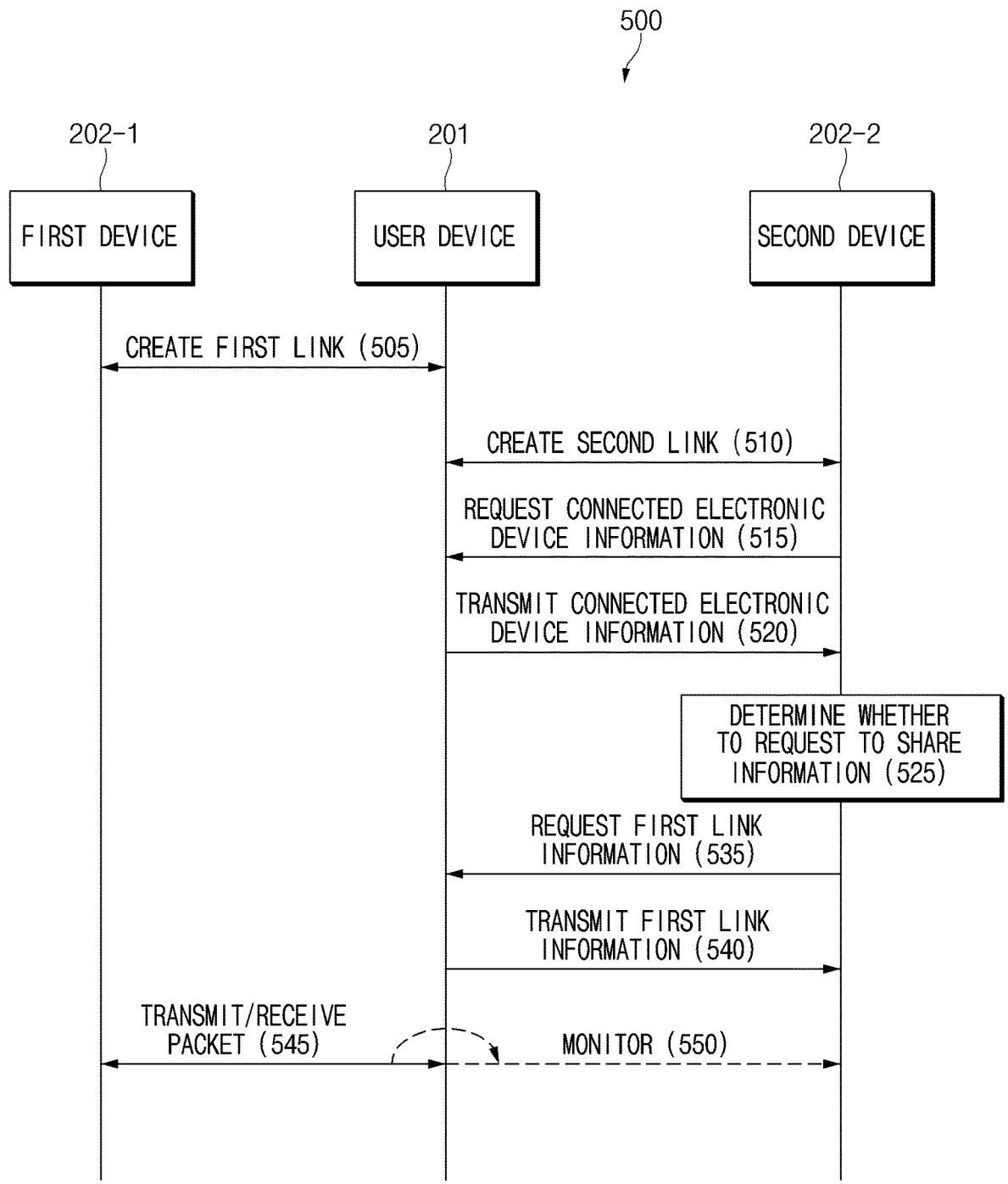
FIG. 5 is a signal flowchart illustrating a link information sharing method based on determination of a second device according to an embodiment.

FIG. 5 is a signal flowchart 500 illustrating a link information sharing method based on determination of the second device 202-2 according to an embodiment.

In operation 505, the first device 202-1 and the user device 201 may establish a first link (e.g., the first link 205 of FIG. 2). In operation 510, the user device 201 and the second device 202-2 may establish a second link (e.g., the second link 210 of FIG. 2). The above descriptions of operation 305 and operation 310 of FIG. 3 may be referenced for operation 505 and operation 510.

According to certain embodiments, in operation 515, the second device 202-2 may transmit a connected electronic device information request to the user device 201. For example, the second device 202-2 may transmit the connected electronic device information request when the second link 210 is created. For another example, the second device 202-2 may transmit the connected electronic device information request if the second link 210 and a third link (e.g., the third link 215 of FIG. 2) are created. The connected electronic device information request, for example, may be a message requesting information of electronic devices connected to the user device 201.

According to certain embodiments, in operation 520, the user device 201 may transmit, to the second device 202-2, information including information of at least one of electronic devices connected to the user device 201 (i.e., "connected electronic device information"). For example, the connected electronic device information may include information of the first device 202-1. For example, the information of the first device 202-1 may include at least one of the address of the first device 202-1, the identification information of the first device 202-1, and/or the manufacturer of the first device 202-1.

According to certain embodiments, in operation 525, the second device 202-2 may determine whether to request sharing of the first link information. The second device 202-2 may determine whether to generate the request for sharing the first link information at least partially based on the name, address, supported feature, manufacturer, and/or setting of the first device 202-1 received from the user device 201.

According to an embodiment, the second device 202-2 may determine whether to request to share the first link information at least partially based on identification information (e.g., name) of the first device 202-1 and the second device 202-2. For example, the second device 202-2 may determine whether to request to share the first link information at least partially based on similarity and/or regularity of the identification information between the first device 202-1 and the second device 202-2. If the first device 202-1 and the second device 202-2 are determined to be electronic devices providing the same service, the second device 202-2 may determine to request to share the first link information.

According to an embodiment, the second device 202-2 may determine whether to request to share the first link information at least partially based on addresses (e.g., Bluetooth address) of the first device 202-1 and the second device 202-2. For example, the second device 202-2 may determine to request to share the first link information if the addresses of the first device 202-1 and the second device 202-2 indicate the same manufacturer and a difference of the LAPs falls within a preset range.

According to an embodiment, the second device 202-2 may determine whether to request to share the first link information at least partially based on at least one of supported features or manufacturers of the first device 202-1 and the second device 202-2. For example, the second device 202-2 may determine to request to share the first link information if the first device 202-1 and the second device 202-2 are identified as electronic devices supporting the same service by using the supported feature information and/or manufacturer information of the first device 202-1 and the second device 202-2.

According to an embodiment, the second device 202-2 may determine whether to request to share the first link information based on at least the identification information, addresses, supported features, and/or manufacturers of the first device 202-1 and the second device 202-2.

According to an embodiment, the second device 202-2 may determine whether to request to share the first link information at least partially based on a setting. For example, the second device 202-2 may be an electronic device configured to share a link with the first device 202-1. For example, the second device 202-2 may obtain a sharing setting from an external server (e.g., the external server 203), the user device 201, or a user input.

When it is determined to request to share the first link information, the second device 202-2 may transmit a first link information request to the user device 201 in operation 535. For example, the second device 202-2 may transmit the first link information request to the user device 201 via the second link 210.

According to an embodiment, in operation 540, the user device 201 may transmit the first link information to the second device 202-2 upon receiving the sharing request. For example, the user device 201 may transmit the first link information to the second device 202-2 via the second link 210. For example, the first link information may include address information, piconet clock information, logical transport address information, used channel map information, link key information, SDP information, and/or supported feature information. The first link information may further include, for example, an EIR packet.

According to an embodiment, the user device 201 may communicate with the first device 202-1 via the first link 205 in operation 545. In operation 550, the second device 202-2 may monitor (e.g., listen on) the first link 205. The above descriptions of operations 325 and 330 of FIG. 3 may be referenced for operation 545 and operation 550.

Figure 6:
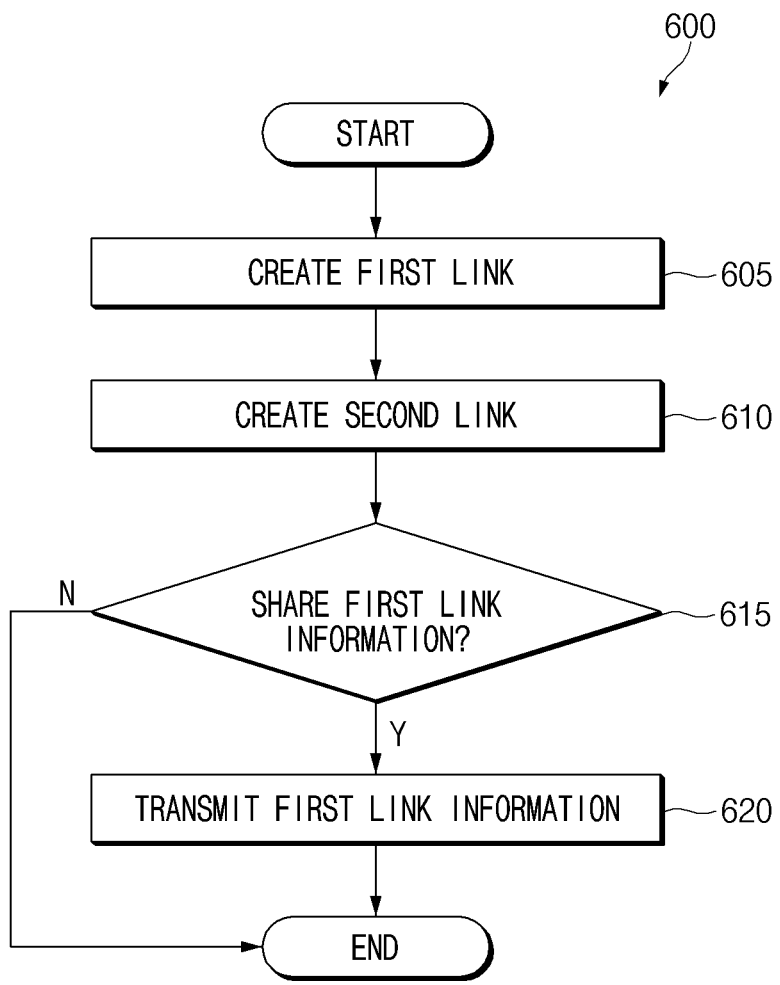
FIG. 6 is a flowchart illustrating a link information sharing method of a user device according to an embodiment.

FIG. 6 is a flowchart 600 illustrating a link information sharing method of a user device according to an embodiment.

According to certain embodiments, a user device (e.g., the user device 201 of FIG. 2) may include a wireless communication circuit (e.g., the communication module 190 of FIG. 1), a memory (e.g., the memory 130 of FIG. 1), and a processor (e.g., application processor and/or communication processor). For example, the processor may be operatively connected to the wireless communication circuit and the memory. The memory may store one or more instructions that, when executed, cause the processor to perform the operations of the user device 201 described below.

According to certain embodiments, in operation 605, the user device 201 may establish a first link (e.g., the first link 205 of FIG. 2) for communication with a first device (e.g., the first device 202-1 of FIG. 2) through the processor and the wireless communication circuit. For example, the above descriptions of operation 305 of FIG. 3 may be referenced for operation 605.

According to certain embodiments, in operation 610, the user device 201 may establish a second link (e.g., the second link 210 of FIG. 2) for communication with a second device (e.g., the second device 202-2 of FIG. 2) through the processor and the wireless communication circuit. For example, the above descriptions of operation 310 of FIG. 3 may be referenced for operation 610.

According to certain embodiments, in operation 615, the user device 201 may determine whether to share first link information with the second device 202-2 through the processor. For example, the above descriptions of operation 315 of FIG. 3 may be referenced for operation 615. If it is determined whether to share the first link information, the user device 201 may transmit the first link information to the second device 202-2 in operation 620. For example, the above descriptions of operation 320 of FIG. 3 may be referenced for operation 620.

Figure 7:
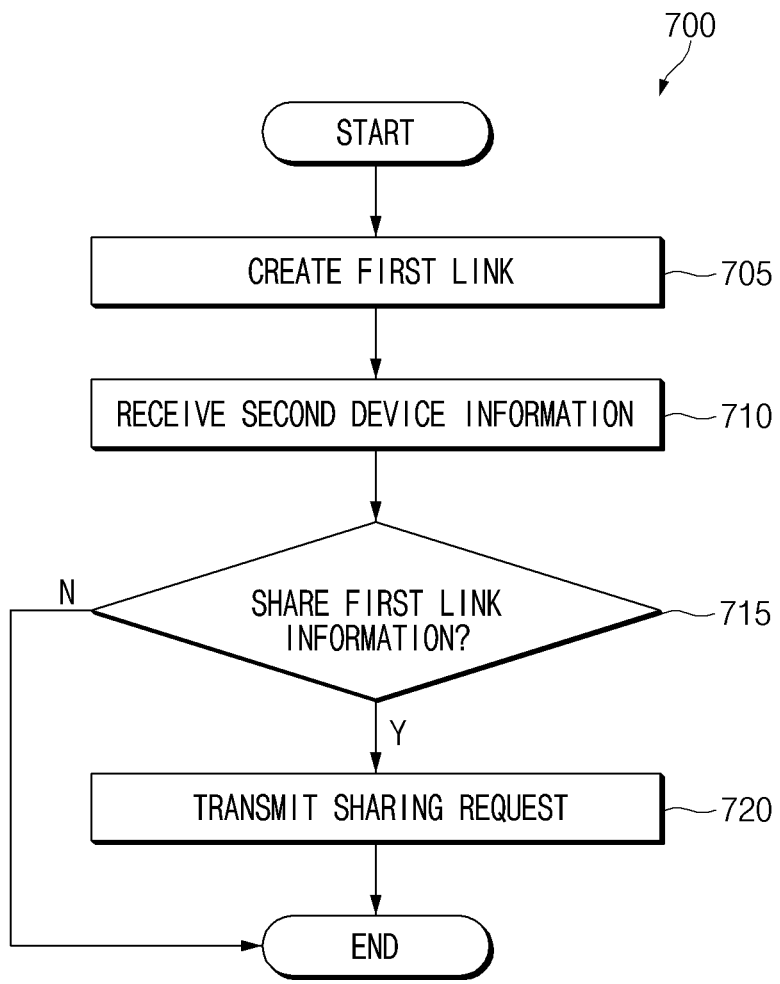
FIG. 7 is a flowchart illustrating a link information sharing method of a first device according to an embodiment.

FIG. 7 is a flowchart 700 illustrating a link information sharing method of a first device according to an embodiment.

According to certain embodiments, a first device (e.g., the first device 202-1 of FIG. 2) may include a wireless communication circuit (e.g., the communication module 190 of FIG. 1), a memory (e.g., the memory 130 of FIG. 1), and a processor (e.g., application processor and/or communication processor). For example, the processor may be operatively connected to the wireless communication circuit and the memory. The memory may store one or more instructions that, when executed, cause the processor to perform the operations of the first device 202-1 described below.

According to certain embodiments, in operation 705, the first device 202-1 may establish a first link (e.g., the first link 205 of FIG. 2) for communication with a user device (e.g., the user device 201 of FIG. 2) through the processor and the wireless communication circuit. For example, the above descriptions of operation 405 of FIG. 4 may be referenced for operation 705.

According to certain embodiments, in operation 710, the first device 202-1 may receive information of a second device (e.g., the second device 202-2 of FIG. 2) from the user device 201 through the processor and the wireless communication circuit. For example, the first device 202-1 may receive the second device information via the first link 205. The descriptions of operation 415 provided above with reference to FIG. 4 apply to the second device information. According to an embodiment, the first device 202-1 may generate a request for the user device 201 to provide the information of the second device 202-2, and may receive the second device information in response to the second device information request.

According to certain embodiments, in operation 715, the first device 202-1 may determine whether to share first link information with other devices through the processor. The above descriptions of operation 420 of FIG. 4 may be referenced for operation 715.

According to certain embodiments, in operation 720, the first device 202-1 may transmit a sharing request to the user device 201 through the wireless communication circuit when determining that the first link information is to be shared. For example, the above descriptions of operation 425 of FIG. 4 may be referenced for operation 720.

Figure 8:
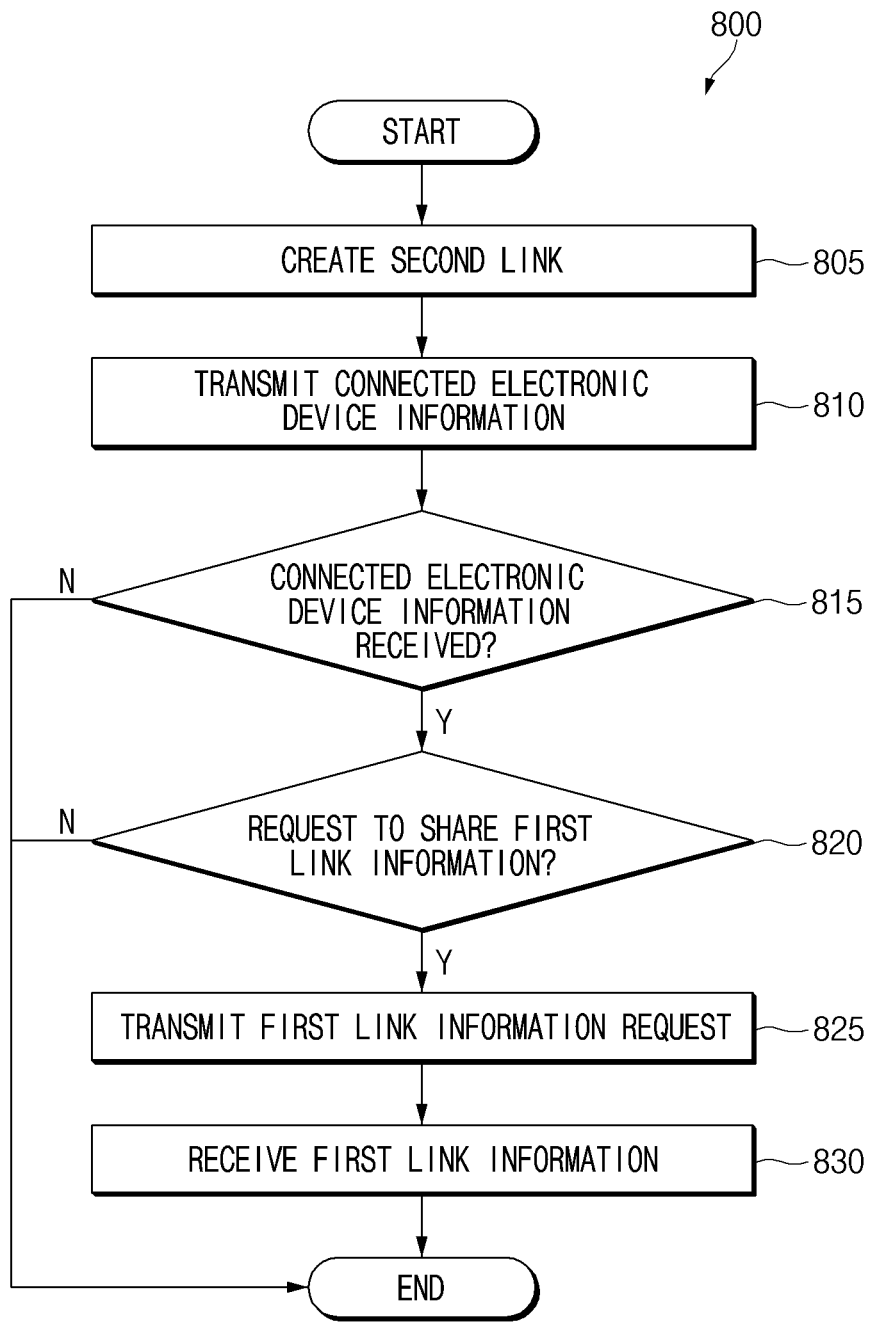
FIG. 8 is a flowchart illustrating a link information sharing method of a second device according to an embodiment.

FIG. 8 is a flowchart 800 illustrating a link information sharing method of a second device according to an embodiment.

According to certain embodiments, a second device (e.g., the second device 202-2 of FIG. 2) may include a wireless communication circuit (e.g., the communication module 190 of FIG. 1), a memory (e.g., the memory 130 of FIG. 1), and a processor (e.g., application processor and/or communication processor). For example, the processor may be operatively connected to the wireless communication circuit and the memory. The memory may store one or more instructions that, when executed, cause the processor to perform the operations of the second device 202-2 described below.

According to certain embodiments, in operation 805, the second device 202-2 may establish a second link (e.g., the second link 215 of FIG. 2) for communication with a user device (e.g., the user device 201 of FIG. 2) through the processor and the wireless communication circuit. The above descriptions of operation 510 of FIG. 5 may be referenced for operation 805.

According to certain embodiments, in operation 810, the second device 202-2 may transmit an information request regarding a connected electronic device to the user device 201 through the processor and the wireless communication circuit. For example, the above descriptions of operation 515 of FIG. 5 may be referenced for operation 810.

According to certain embodiments, in operation 815, the second device 202-2 may determine, through the processor, whether connected electronic device information has been received. For example, the second device 202-2 may determine whether the connected electronic device information is received from the user device 201 within a specified time after transmitting the connected electronic device information request. If the connected electronic device information is not received from the user device 201 within the specified time or a rejection response is received from the user device 201, link information sharing may be ended.

According to certain embodiments, if the connected electronic device information is received, the second device 202-2 may determine whether to request sharing of the first link information through the processor in operation 820. For example, the above descriptions of operation 525 of FIG. 5 may be referenced for operation 820.

According to certain embodiments, if it is determined to request sharing of the first link information, the second device 202-2 may generate and transmit a request to share first link information to the user device 201 through the processor and the wireless communication circuit in operation 825. For example, the above descriptions of operation 535 of FIG. 5 may be referenced for operation 825.

According to certain embodiments, in operation 830, the second device 202-2 may receive the first link information, as transmitted from the user device 201 through the processor and the wireless communication circuit, responsive to the request. For example, the above descriptions of operation 540 of FIG. 5 may be referenced for operation 830. The second device 202-2 may monitor the first link 205 using the received first link information.

Figure 9:
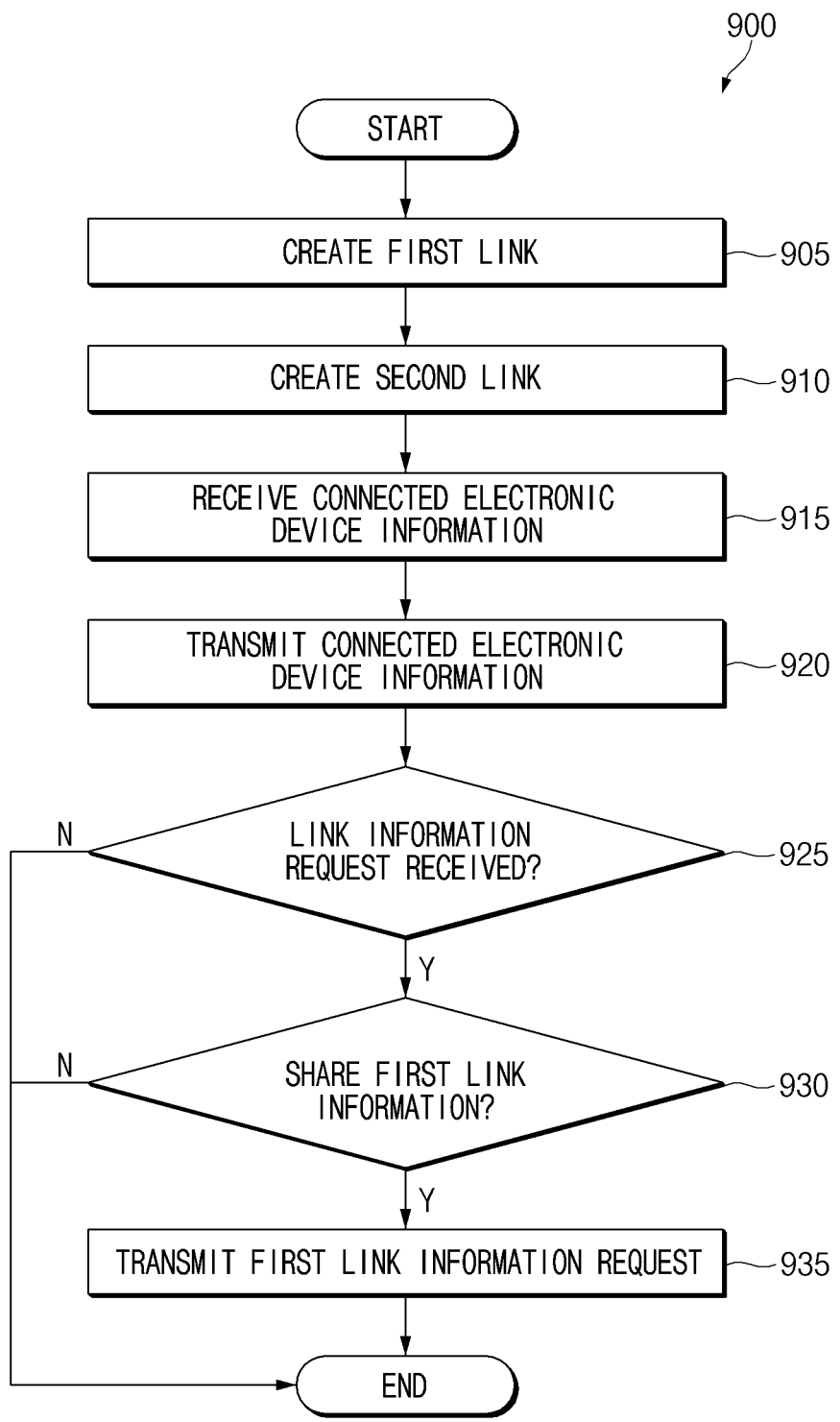
FIG. 9 is a flowchart illustrating a link information sharing method of a user device according to an embodiment.

FIG. 9 is a flowchart illustrating a link information sharing method 900 of a user device according to an embodiment.

According to certain embodiments, a user device (e.g., the user device 201 of FIG. 2) may include a wireless communication circuit (e.g., the communication module 190 of FIG. 1), a memory (e.g., the memory 130 of FIG. 1), and a processor (e.g., application processor and/or communication processor). For example, the processor may be operatively connected to the wireless communication circuit and the memory. The memory may store one or more instructions that, when executed, cause the processor to perform the operations of the user device 201 described below.

According to certain embodiments, in operation 905, the user device 201 may create a first link (e.g., the first link 205 of FIG. 2) with a first device (e.g., the first device 202-1 of FIG. 2) through the processor and the wireless communication circuit. For example, the above descriptions of operation 505 of FIG. 5 may be referenced for operation 905.

According to certain embodiments, in operation 910, the user device 201 may create a second link (e.g., the second link 210 of FIG. 2) with a second device (e.g., the second device 202-2 of FIG. 2) through the processor and the wireless communication circuit. For example, the above descriptions of operation 510 of FIG. 5 may be referenced for operation 910.

According to certain embodiments, in operation 915, the user device 201 may receive a connected electronic device information request from the second device 202-2 through the processor and the wireless communication circuit. The above descriptions of operation 515 of FIG. 5 may be referenced for operation 915.

According to certain embodiments, in operation 920, the user device 201 may transmit connected electronic device information to the second device 202-2 through the processor and the wireless communication circuit. The above descriptions of operation 520 of FIG. 5 may be referenced for operation 920. According to an embodiment, operation 915 may be skipped. For example, even if the connected electronic device information request is not received, the user device 201 may transmit the connected electronic device information to the second device 202-2 if the second link 210 is generated.

According to certain embodiments, in operation 925, the user device 201 may determine, through the processor, whether a link information request is received. For example, the user device 201 may determine whether a signal that requests information about a link (e.g., first link information) with another electronic device and is based on the connected electronic device information transmitted in operation 920 is received via the second link 210 from the second device 202-2.

According to certain embodiments, in operation 930, the user device 201 may determine whether to share first link information through the processor. For example, as described above in relation to operation 315 of FIG. 3, the user device 201 may determine whether to share the first link information. According to an embodiment, operation 930 may be skipped. In this case, the user device 201 may perform operation 935 if the link information request is received.

According to certain embodiments, in operation 935, the user device 201 may transmit the first link information through the processor and the wireless communication circuit. For example, the user device 201 may transmit the first link information to the second device 202-2 if the first link is determined to be shared. For example, the above descriptions of operation 540 of FIG. 5 may be referenced for operation 935. According to an embodiment, in operation 925 or operation 930, the user device 201 may reject a link information sharing request received from the second device 202-2. For example, the user device 201 may reject the link information sharing request at least partially based on the name, address, supported feature, manufacturer, sharing request, setting, sharing history, and/or account of each of the second device 202-2 and the first device 202-1.

Figure 10:
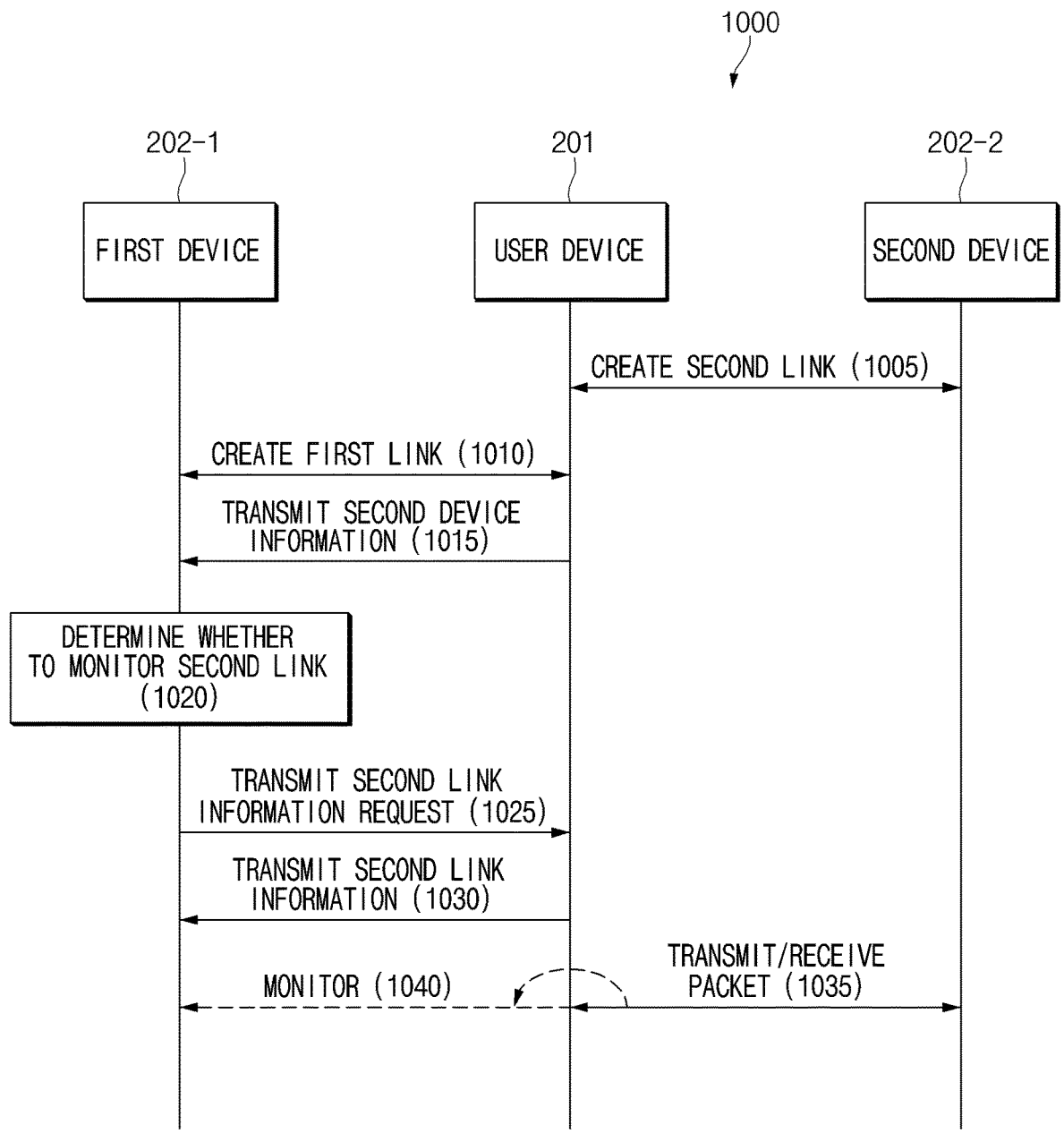
FIG. 10 is a signal flowchart illustrating a link monitoring method of a first device according to an embodiment.

FIG. 10 is a signal flowchart 1000 of a link monitoring method of the first device 202-1 according to an embodiment.

It has been described with reference to FIGS. 2 and 9 that the user device 201 and the first device 202-1 create the first link 205, and the second device 202-2 monitors a first link (e.g., the first link 205 of FIG. 2) using the first link information. However, embodiments of the present disclosure are not limited thereto. According to an embodiment, the user device 201 may transmit a data packet to the second device 202-2 via a second link (e.g., the second link 210 of FIG. 2), and the first device 202-1 may receive the data packet by monitoring the second link 210.

According to certain embodiments, in operation 1005, the user device 201 and the second device 202-2 may establish the second link 210. For example, the user device 201 and the second device 202-2 may create the second link 210 according to the method described above with reference to FIG. 3.

According to certain embodiments, in operation 1010, the user device 201 and the first device 202-1 may establish the first link 205. For example, the user device 201 and the first device 202-1 may create the first link 205 according to the method described above with reference to FIG. 3. In the example of FIG. 10, the user device 201 may transmit data to the second device 202-2 connected earlier among the first device 202-1 and the second device 202-2, and the first device 202-1 may monitor the data.

According to certain embodiments, in operation 1015, the user device 201 may transmit second device information to the first device 202-1. For example, if the first link 205 is established after the second link 210 is established, the user device 201 may transmit the second device information to the first device 202-1 based on information of the second device 202-2 and/or the first device 202-1. The second device information may include, for example, at least one of the address of the second device 202-2, the identification information of the second device 202-2, and/or the manufacturer of the second device 202-2.

According to certain embodiments, in operation 1020, the first device 202-1 may determine whether to monitor the second link. For example, the first device 202-1 may determine whether to monitor at least partially based on the identification information, address, supported feature, manufacture, and/or setting of each of the first device 202-1 and the second device 202-2.

If the second link 210 is determined to be monitored, the first device 202-1 may transmit a second link information request to the user device 201 via the first link 205 in operation 1025.

In operation 1030, the user device 201 may transmit the second link information to the first device 202-1 in response to the second link information request. For example, the second link information may include address information (e.g., Bluetooth information) of the user device 201, piconet clock information (e.g. clock native (CLKN) of the master device of the second link 210), logical transport address information (e.g., information of a slave device of the second link 210), used channel map information, link key information, service discovery protocol (SDP) information (e.g., service and/or profile information associated with the second link 210), and/or supported feature information. The second link information may further include, for example, an extended inquiry response (EIR) packet. The EIR packet may include resource control information about the second link 210.

According to an embodiment, the user device 201 may communicate with the second device 202-2 via the second link 210 in operation 1035. For example, the user device 201 may transmit (e.g., unicast) a data (e.g., data including media) packet to the second device 202-2 via the second link 210.

In operation 1040, the first device 202-1 may monitor (e.g., listen on) the second link 210. According to an embodiment, the first device 202-1 may monitor the second link 210 using the second link information. For example, the first device 202-1 may monitor the second link 210 upon receiving an additional request from the user device 201 after continuously performing page scanning by using the Bluetooth address of the second device 202-2. For another example, the first device 202-1 may monitor the second link 210 upon receiving the second link information. The first device 202-1 may identify a hopping channel of the second link 210 using clock information and a Bluetooth address of a master device of the second link 210. The first device 202-1 may monitor the second link 210 using the identified hopping channel.

In the example of FIG. 10, the second device 202-2 may transmit, to the first device 202-1, a response message for the data packet received from the user device 201 via the second link 210. For example, the second device 202-2 may transmit ACK/NACK to the first device 202-1 via a third link (e.g., the third link 215 of FIG. 2). According to an embodiment, the first device 202-1 may transmit a response message to the user device 201 at least partially based on ACK/NACK received from the second device 202-2. For example, if the first device 202-1 successfully monitors (e.g., listens for) data transferred via the second link 210, and receives ACK from the second device 202-2, the first device 202-1 may transmit a response message indicating ACK to the user device 201 via the first link 205. If the first device 202-1 fails to monitor the second link 210 or receives NACK from the second device 202-2, the first device 202-1 may transmit a response message indicating NACK to the user device 201.

According to certain embodiments, an electronic device (e.g., the user device 201 of FIG. 2) may include a wireless communication circuit (e.g., the communication module 190 of FIG. 1), a processor (e.g., the processor 120 of FIG. 1) operatively connected to the wireless communication circuit, and a memory (e.g., the memory 130 of FIG. 1) operatively connected to the processor. According to an embodiment, the memory may store one or more instructions that, when executed, cause the at least one processor to: create a first link (e.g., the first link 205 of FIG. 2) with a first external electronic device (e.g., the first device 202-1 of FIG. 2) using the wireless communication circuit; create a second link (e.g., the second link 210 of FIG. 2) with a second external electronic device (e.g., the second device 202-2 of FIG. 2) through the wireless communication circuit; determine whether to share, with the second external electronic device, first link information for estimating a channel of the first link at least partially based on information of the second external electronic device and information of the first external electronic device; transmit the first link information to the second external electronic device via the second link based on the determination; and transmit a data packet to the first external electronic device via the first link.

According to an embodiment, the one or more instructions, when executed, may cause the processor to determine whether to share the first link information at least partially based on similarity of identification information between the first external electronic device and the second external electronic device.

According to an embodiment, the one or more instructions, when executed, may cause the processor to determine whether to share the first link information at least partially based on addresses of the first external electronic device and the second external electronic device.

According to an embodiment, the one or more instructions, when executed, may cause the processor to determine to share the first link information when the addresses of the first external electronic device and the second external electronic device have the same organizationally unique identifier (OUI) and a difference of lower address part (LAP) between the addresses falls within a preset range.

According to an embodiment, the one or more instructions, when executed, may cause the processor to determine to share the first link information based on manufacturers and supported service information of the first external electronic device and the second external electronic device.

According to an embodiment, the first link information may include at least one of address information, piconet clock information, logical transport address information, used channel map information, link key information, service discovery protocol (SDP) information, or supported feature information of at least one electronic device associated with the first link.

According to an embodiment, the electronic device may transmit the first link information so as to allow the second external electronic device to monitor the data packet using the first link information. For example, the one or more instructions, when executed, may cause the processor to determine whether to retransmit the data packet based on a response message for the data packet from the first external electronic device.

According to an embodiment, the one or more instructions, when executed, may cause the processor to transmit a subsequent data packet of the data packet when the response message received from the first external electronic device indicates positive acknowledgement. For example, the positive acknowledgement may indicate that the first external electronic device and the second external electronic device have successfully received the data packet.

According to certain embodiments, an electronic device (e.g., the first device 202-1 of FIG. 2) may include a wireless communication circuit (e.g., the communication module 190 of FIG. 1), a processor (e.g., the processor 120 of FIG. 1) operatively connected to the wireless communication circuit, and a memory (e.g., the memory 130 of FIG. 1) operatively connected to the processor. According to an embodiment, the memory may store one or more instructions that, when executed, cause the processor to: create a first link (e.g., the first link 205 of FIG. 2) with a user device (e.g., the user device 201 of FIG. 2) using the wireless communication circuit; receive information of an external device (e.g., the second device 202-2 of FIG. 2) connected to the user device from the user device using the wireless communication circuit; determine whether to share, with the external electronic device, first link information for estimating a channel of the first link at least partially based on the information of the external electronic device and information of the electronic device; and transmit, based on the determination, a sharing request instructing sharing of the first link information with the external device to the user device via the first link.

According to an embodiment, the one or more instructions, when executed, may cause the processor to determine whether to share the first link information at least partially based on similarity of identification information between the electronic device and the external device.

According to an embodiment, the one or more instructions, when executed, may cause the processor to determine whether to share the first link information at least partially based on addresses of the electronic device and the external device.

According to an embodiment, the one or more instructions, when executed, may cause the processor to determine to share the first link information when the addresses of the electronic device and the external device have the same organizationally unique identifier (OUI) and a difference of lower address part (LAP) between the addresses falls within a preset range.

According to an embodiment, the one or more instructions, when executed, may cause the processor to determine to share the first link information based on manufacturers and supported service information of the electronic device and the external device.

For example, the first link information may include at least one of address information, piconet clock information, logical transport address information, used channel map information, link key information, service discovery protocol (SDP) information, or supported feature information of at least one electronic device associated with the first link.

According to an embodiment, the one or more instructions, when executed, may cause the processor to: create a second link with the external device using the wireless communication circuit; receive a first message indicating whether a first data packet has been received from the external device via the second link; transmit a second message indicating positive acknowledgement for the first data packet to the user device via the first link when the first message indicates successful data packet reception and the first data packet is successfully received via the first link; and transmit the second message indicating negative acknowledgement for the first data packet to the user device via the first link when the first message indicates data packet reception failure or reception of the first data packet via the first link fails.

According to certain embodiments, an electronic device (e.g., the second device 202-2 of FIG. 2) may include a wireless communication circuit (e.g., the communication module 190 of FIG. 1), a processor (e.g., the processor 120 of FIG. 1) operatively connected to the wireless communication circuit, and a memory (e.g., the memory 130 of FIG. 1) operatively connected to the processor. The memory may store one or more instructions that, when executed, cause the processor to: create a second link (e.g., the second link 210 of FIG. 2) with a user device (e.g., the user device 201 of FIG. 2) using the wireless communication circuit; transmit, to the user device via the second link, a signal requesting information of an electronic device connected to the user device using the wireless communication circuit; receive information of an external device (e.g., the first device 202-1 of FIG. 2) connected to the user device via a first link (e.g., the first link 205 of FIG. 2) from the user device using the wireless communication circuit; determine whether to request to share, with the external electronic device, first link information for estimating a channel of the first link at least partially based on the information of the external electronic device and information of the electronic device; transmit, based on the determination, a signal requesting to share the first link information to the user device via the second link; and, upon receiving the first link information from the user device, monitor a data packet transmitted from the user device to the external device via the first link using the first link information.

According to an embodiment, the one or more instructions, when executed, may cause the processor to determine to share the first link information when the addresses of the electronic device and the external electronic device have the same organizationally unique identifier (OUI) and a difference of lower address part (LAP) between the addresses falls within a preset range.

According to an embodiment, the one or more instructions, when executed, may cause the processor to determine to share the first link information based on manufacturers and supported service information of the electronic device and the external device.

For example, the first link information may include at least one of address information, piconet clock information, logical transport address information, used channel map information, link key information, service discovery protocol (SDP) information, or supported feature information of at least one electronic device associated with the first link.

According to an embodiment, the one or more instructions, when executed, may cause the processor to: create a third link (e.g., the third link 215 of FIG. 2) with the external device using the wireless communication circuit; receive a data packet transmitted to the external device by monitoring the first link; and transmit, via the third link, a message indicating a result of receiving the data packet.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a wireless communication circuit;
   a processor operatively connected to the wireless communication circuit; and
   a memory operatively connected to the processor,
   wherein the memory stores one or more instructions that, when executed, cause the processor to:
   establish a first link with a first external electronic device using the wireless communication circuit;
   establish a second link with a second external electronic device using the wireless communication circuit;
   determine whether to share, with the second external electronic device, first link information for estimating a channel of the first link at least partially based on a comparison between an address of the second external electronic device and an address of the first external electronic device;
   transmit the first link information to the second external electronic device via the second link based on the determination; and
   transmit a data packet to the first external electronic device via the first link,
   wherein the one or more instructions, when executed, cause the processor to determine to share the first link information when the addresses of the first external electronic device and the second external electronic device have the same organizationally unique identifier (OUI) and a difference of lower address part (LAP) between the addresses falls within a preset range.

2. The electronic device of claim 1, wherein the one or more instructions, when executed, cause the processor to determine whether to share the first link information further based on similarity between of identification information of the first external electronic device and identification information of the second external electronic device.

3. The electronic device of claim 1, wherein the one or more instructions, when executed, cause the processor to determine to share the first link information further based on manufacturers and supported service information of the first external electronic device and the second external electronic device.

4. The electronic device of claim 1, wherein the first link information includes at least one of address information, piconet clock information, logical transport address information, used channel map information, link key information, service discovery protocol (SDP) information, or supported feature information of at least one electronic device associated with the first link.

5. The electronic device of claim 4,
   wherein the electronic device transmits the first link information for monitoring of the data packet using the first link information by the second external electronic device, and
   wherein the one or more instructions, when executed, cause the processor to determine whether to retransmit the data packet based on a response message for the data packet from the first external electronic device.

6. The electronic device of claim 5,
   wherein the one or more instructions, when executed, cause the processor to transmit a subsequent data packet of the data packet when the response message received from the first external electronic device indicates positive acknowledgement, wherein the positive acknowledgement indicates that the first external electronic device and the second external electronic device have successfully received the data packet.

7. An electronic device comprising:
   a wireless communication circuit;
   a processor operatively connected to the wireless communication circuit; and
   a memory operatively connected to the processor,
   wherein the memory stores one or more instructions that, when executed, cause the processor to:
   establish a first link with a user device using the wireless communication circuit;
   receive information from the user device regarding an external device connected to the user device using the wireless communication circuit;
   determine, after establishing the first link and after the user device establishes a second link with the external device, whether to share, with the external device, first link information for estimating a channel of the first link, at least partially based on a comparison between an address of the external device and an address of the electronic device; and
   transmit, based on the determination, a sharing request instructing sharing of the first link information with the external device to the user device via the first link.

8. The electronic device of claim 7, wherein the one or more instructions, when executed, cause the processor to determine whether to share the first link information at least partially based on similarity between identification information of the electronic device and identification information of the external device.

9. The electronic device of claim 7, wherein the one or more instructions, when executed, cause the processor to determine to share the first link information when the addresses of the electronic device and the external device have the same organizationally unique identifier (OUI) and a difference of lower address part (LAP) between the addresses falls within a preset range.

10. The electronic device of claim 7, wherein the one or more instructions, when executed, cause the processor to determine to share the first link information at least partially based on manufacturers and supported service information of the electronic device and the external device.

11. The electronic device of claim 7, wherein the first link information includes at least one of address information, piconet clock information, logical transport address information, used channel map information, link key information, service discovery protocol (SDP) information, or supported feature information of at least one electronic device associated with the first link.

12. The electronic device of claim 11, wherein the one or more instructions, when executed, cause the processor to:
establish a third link with the external device using the wireless communication circuit;
receive a first message via the third link from the external device indicating whether a first data packet is received via the second link;
transmit a second message via the first link to the user device indicating positive acknowledgement for the first data packet when the first message indicates successful data packet reception; and
transmit the second message via the first link to the user device indicating negative acknowledgement for the first data packet when the first message indicates data packet reception failure or when reception of the first data packet fails.

* * * * *